United States Patent
Rusko et al.

(10) Patent No.: US 10,681,917 B2
(45) Date of Patent: Jun. 16, 2020

(54) FISH SLAUGHTER DEVICE AND TRIGGER DEVICE CONFIGURED FOR SAME

(71) Applicant: NORDISCHER MASCHINENBAU RUD. BAADER GMBH + CO. KG, Luebeck (DE)

(72) Inventors: Torsten Rusko, Herrnburg (DE); Dirk Runge, Luebeck (DE); Mirko Pagels, Luebeck (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 16/315,915

(22) PCT Filed: Jul. 8, 2016

(86) PCT No.: PCT/EP2016/066325
§ 371 (c)(1),
(2) Date: Jan. 7, 2019

(87) PCT Pub. No.: WO2018/006981
PCT Pub. Date: Jan. 11, 2018

(65) Prior Publication Data
US 2019/0307136 A1  Oct. 10, 2019

(51) Int. Cl.
*A22B 3/00* (2006.01)
*A22B 3/08* (2006.01)
*A22B 7/00* (2006.01)

(52) U.S. Cl.
CPC ............... *A22B 3/08* (2013.01); *A22B 3/083* (2013.01); *A22B 7/001* (2013.01)

(58) Field of Classification Search
CPC .. A01K 61/95; A22B 3/00; A22B 3/02; A22B 3/083

(Continued)

(56) References Cited

U.S. PATENT DOCUMENTS

| | | | |
|---|---|---|---|
| 6,183,356 B1* | 2/2001 | Middleton | A22B 3/083 452/57 |
| 6,769,976 B2* | 8/2004 | Bass | A22B 3/083 452/62 |

(Continued)

FOREIGN PATENT DOCUMENTS

| | | |
|---|---|---|
| CL | 200901791 | 2/2011 |
| CL | 201200307 | 8/2012 |

(Continued)

OTHER PUBLICATIONS

PCT Search Report and Written Opinion issued in PCT/EP2016/066325.

(Continued)

*Primary Examiner* — Richard T Price, Jr.
(74) *Attorney, Agent, or Firm* — Greenblum & Bernstein, P.L.C.

(57) ABSTRACT

Fish slaughter device includes fish positioning device with fish head abutment, against which the fish head abuts temporary stop position by controllable fish slaughter tool. Fish head abutment element is a trigger releasable by a trigger sensor of a controllable trigger controllable to move the fish head abutment into different trigger positions. device includes a first control actuator with a first actuator, a coupling device, connecting the fish head abutment to the first actuator for adjusting movement into the trigger positions, and an additional second control actuator with a second actuator controllably placeable in at least two fixed trigger adjustment positions. The two actuators are coupled so an adjusting movement of the first actuator is stopped by a coupling impact against the second actuator in a fixed trigger adjustment positions, which brings about an associated trigger position of the fish head abutment.

20 Claims, 6 Drawing Sheets

(58) Field of Classification Search
USPC .... 452/52–54, 56–62, 65–68, 166, 196, 161
See application file for complete search history.

(56) References Cited

U.S. PATENT DOCUMENTS

| | | | |
|---|---|---|---|
| 7,220,177 B2 * | 5/2007 | King | A22B 3/083 |
| | | | 452/62 |
| 7,575,507 B2 | 8/2009 | King | |
| 7,980,925 B2 * | 7/2011 | Bass | A22B 3/083 |
| | | | 452/57 |
| 10,004,240 B2 | 6/2018 | King | |
| 10,114,240 B2 * | 10/2018 | Liang | B05D 3/10 |
| 10,117,441 B2 * | 11/2018 | Goodrick | A22B 1/00 |
| 2003/0171085 A1 | 9/2003 | Bass | |
| 2006/0194531 A1 | 8/2006 | King | |
| 2007/0204503 A1 | 9/2007 | King | |
| 2014/0378038 A1 | 12/2014 | Baeza Rischter | |
| 2017/0265486 A1 | 9/2017 | King | |

FOREIGN PATENT DOCUMENTS

| | | |
|---|---|---|
| CL | 201203064 | 1/2013 |
| WO | 2001/097621 | 12/2001 |
| WO | 2004/049810 | 6/2004 |
| WO | 2016/026540 | 2/2016 |
| WO | 2018/006981 | 1/2018 |

OTHER PUBLICATIONS

Danish Search Report issued in PA 2019/00109 and dated Oct. 8, 2019.
Chilean Office Action issued in Application No. 201900046 and dated Nov. 5, 2019.

\* cited by examiner

FISH SLAUGHTER DEVICE AND TRIGGER DEVICE CONFIGURED FOR SAME

CROSS-REFERENCE TO RELATED APPLICATIONS

The instant application is a US National stage of PCT International Application No. PCT/EP2016/066325 filed Jul. 8, 2016.

BACKGROUND OF THE INVENTION

1. Field of the Invention

The invention relates to a fish slaughter device, comprising a fish receiving space, which can be charged with fish to be slaughtered in the head-first position through a receiving space entry, and a fish positioning device, configured for controllably holding and positioning a fish in the fish receiving space in a temporary stop position of said fish, which is associated with at least one controllable fish slaughter tool for slaughtering the fish, and also configured for controllably releasing the slaughtered fish; the fish positioning device comprises a fish head abutment element, against which the fish head of the fish abuts in the temporary stop position, which in addition forms a trigger element for controlling the at least one controllable fish slaughter tool and can be moved by way of a trigger device, which is controllable as a function of the fish size, into different trigger positions each determining the temporary stop position of the fish, and a delivery way for releasing and delivering the processed fish.

The fish slaughter device further comprises the at least one controllable fish slaughter tool for acting on the fish in its temporary stop position, a trigger sensor device for detecting the abutment of a fish head against the fish head abutment element and the controllable trigger device; this comprises the fish head abutment element, a stationary, controllable first control actuator with a first actuator element and a coupling mechanism which connects the fish head abutment element to the first actuator element of the first control actuator for fish-size-dependent controllable adjusting movement of the fish head abutment element into the trigger positions.

The invention also relates to a trigger device configured for a fish slaughter device having at least one fish slaughter tool for acting on a fish head for slaughtering the fish, comprising a chassis, a fish head abutment element mounted on said chassis, which abutment element is configured for abutment of the fish head of a fish to be slaughtered, and forming a trigger element which is operable due to abutment of the fish head, said trigger element being connectable to a controller for operating a fish slaughter device, a controllable first control actuator arranged on the chassis with a first actuator element, as well as a coupling mechanism slidingly mounted on the chassis, which slidingly mounts the fish head abutment element on the chassis and connects it to the first actuator element of the first control actuator for adjusting movement of the fish head abutment element with it which can be controlled depending on the fish size.

Depending on the fish size measured, the fish receiving space is lengthened or shortened on its side receiving the fish head by the associated trigger positions. This ensures that uniform points or areas of the fish, on which the fish slaughter tool or tools can act optimally, arrive in front of the fish slaughter tool in the same way for every fish. This measure is also particularly aimed at complying with animal welfare regulations.

1. Discussion of Background Information

A fish slaughter device with said features is disclosed in WO 2016/026540 A1. Fish are fed to the fish slaughter device individually and consecutively. The fish arrive in the fish receiving space individually in the ventral position and head first with or in a flow of water. The mounted fish head abutment element of the trigger device is located in said space. The fish head abuts against the fish head abutment element under its own weight, thereby reaching a temporary stop position. The fish head abutment element is slidingly mounted on a base body and can be fixed to the base body in a sliding position determined by a fish-size controller. The sliding position is adjusted using a controlled actuator means which is mounted on the base body. A sensor means responsive to the fish head abutting against the fish head abutment element initiates the operation of fish slaughter tools. A first fish slaughter tool is a stunning means, namely in particular a striker or similar stunning tool which hits the skull of the fish head and is movable between a retracted non-operative position and an extended operative position, namely the striking position. A second fish slaughter tool is a bleeding tool acting after stunning, which in the form of a knife, for example, can be inserted between the gill cover and the head or body of the fish for severing the main artery. The bleeding tool is controlled and operated similarly to the stunning tool.

To achieve desired high throughput rates of the fish through the fish slaughter device while observing animal welfare regulations, it is important to provide a mechanism which is as simple to control as possible in conjunction with an easy to operate actuator means. In a device according to WO 2016/026540 A1, such an objective reaches its limits. Although the use of a simple pressure piston cylinder, whose actuator element can only be brought into limit positions, simplifies the control system in respect of higher throughput speeds, size-dependent adjustment of the fish head abutment element remains limited, particularly also with regard to processing that is animal welfare-compliant. The base body supporting the actuator means is part of the sensor means in such a manner that the fish head abutment element initiates operation of the fish slaughter tools in a set trigger position, which is fixed on the base body, together with the base body by means of the sensor means. A relatively high abutment force of the fish head against the fish head abutment element is required for triggering. This results in a susceptibility to malfunctioning and impairment of the fish throughput rate. As part of the sensor means, the base body requires special installation and operating space. Therefore, according to WO 2016/026540 A1, an additional pressure piston cylinder is configured with which the fish head abutment element can be pivoted away in front of the trigger device to release the fish head.

SUMMARY OF THE INVENTION

The objects of the invention are to improve the trigger device and the fish slaughter device structurally and functionally and design them relatively simply in terms of a high fish throughput rate, to achieve processing that is compliant with animal welfare regulations and to prevent susceptibility to the disruption of operation.

The objects are achieved in conjunction with the features of the fish slaughter device referred to at the outset in that the trigger device comprises a stationary, controllable second control actuator configured for fish-size-dependent adjustment of at least two trigger positions having a second actuator element, wherein the second actuator element can be placed controllably into at least two fixed trigger adjustment positions of the second actuator element, and that the two actuator elements, i.e. the first actuator element and the second actuator element are coupled in such a manner that an adjusting movement of the first actuator element is stopped by a coupling impact against the second actuator element placed in one of its fixed trigger adjustment positions and thereby bringing about a said trigger position of the fish head abutment element associated with the set fixed trigger adjustment position of the second actuator element.

The objects are achieved accordingly with the trigger device referred to at the outset in that the trigger device comprises a controllable second control actuator which is arranged on the chassis, configured for fish-size-dependent adjustment of at least two trigger positions having a second actuator element, wherein the second actuator element can be placed controllably into at least two fixed trigger adjustment positions of the second actuator element, and that the two actuator elements, i.e. the first actuator element and the second actuator element are coupled in such a manner that an adjusting movement of the first actuator element is stopped by a coupling impact against the second actuator element placed in one of its fixed trigger adjustment positions and thereby brings about a said trigger position of the fish head abutment element associated with the set fixed trigger adjustment position of the second actuator element.

A number of advantages are achieved. According to the invention, the second actuator element of the second controllable control actuator acts on the first actuator element of the first controllable control actuator in such a way that they jointly determine setting positions of the first control actuator depending on the fish size and corresponding trigger positions of the fish head abutment element forming the trigger element. The second control actuator acts controllably on the coupling mechanism which connects the fish head abutment element to the first actuator element of the first control actuator. In addition, the coupling mechanism establishes the coupling or couplability between the two actuator elements. The action is such that the first control actuator works with the first actuator element against the fixed trigger adjustment positions, namely fixed stop positions of the second actuator element, and thus is held in each case in a stop state which corresponds to one of the fixed trigger adjustment positions of the second control actuator and determines the associated trigger position of the fish head abutment element. It has been found that preferably three, but if necessary even more, fish-size-dependent trigger positions, which can be adjusted by at least three fixed trigger adjustment positions, bring about operation that is sufficiently positionally accurate and improves the fish throughput. According to the invention, the fish-size-dependent controllability into preferably three temporary stop positions of the fish is sufficient to establish the position of the fish head with respect to one or each fish slaughter tool as a function of variations in the fish sizes. Thus varying fish sizes of fish that are to be slaughtered automatically and continuously one after another can be optimally assigned to three fish size ranges, the controller being configured in such a way that each fish size range is associated with a temporary fish stop position to be effected. According to the invention, a slaughtering operation is achieved that is compliant with animal welfare, prevents operational malfunctions and nevertheless permits high fish throughput.

According to the invention, the first control actuator and the second control actuator cooperate in such a way that the second control actuator is a master actuator and the first control actuator is a slave actuator, the second control actuator imposing at least two adjusting positions determining the trigger positions on the first control actuator. In order to preferably bring about two fixed trigger adjustment positions, it must only be possible to move the second control actuator into two corresponding bistable setting positions, expediently end positions of a pneumatic cylinder. From a control technology point of view, such end positions can be approached at high speed. The second control actuator is also in such end states, namely a starting position and an end position, in especially stable and thus precisely reproducible, robust states even under abutment force. Advantageously, a coupling mechanism, which couples the first actuator element and the second actuator element to each other, is tension-resistantly connected to the first actuator element.

According to the invention, in combination with the controllable temporary stop position of the fish, a centring arrangement of the fish, supporting this positioning as a function of the fish size, can be configured in the fish receiving space. The controlled centring arrangement allows optimum (largest possible) fish size ranges for each trigger position. The centring arrangement also has inventive significance independently of the design of the trigger device. One embodiment consists in that the fish positioning device for centring the fish in a temporary stop position comprises at least one pair of flank flaps which limit the fish receiving space laterally, and that the two flank flaps of the pair can be acted upon by a compressive force, which is dependent upon the fish size, in a defined home position in which each fish arrives between the two flank flaps by way of a compressive force controller controlled by a device controller, in such a manner that the two flank flaps are prestressed in the stationary home position to exert the compressive force such that they are correspondingly displaceable against the compressive force by way of the fish depending on the fish size. In particular, the centring can also be configured independently of the size range control, that is to say independently of the size step control of the trigger device. For a fish with a small width, the prestress compressive force is lower than for a fish with a larger width. The displacement force to be exerted on the flank flaps by a fish passing through, which corresponds to the compressive force to be overcome, is already adjusted by the controller dependent on the fish size before the fish reaches the centring flank flaps.

The fish slaughter device according to the invention, which is controllable depending on the fish size, is improved in particular in that it comprises a device controller which is connected by way of control technology to a fish-size determining device for fish-size-dependent operational control, to the controllable control actuators of the trigger device, to the trigger sensor device, to the at least one controllable fish slaughter tool and to the controllable delivery mechanism. In the case of the embodiment with the centred flank flaps, the device controller is also connected to a centring actuator which controls the pressure prestress of the flank flaps. Expediently, a fish-size determining device, which determines the fish size, is integrated in the fish slaughter device to generate fish-size-dependent control signals which act upon a device controller.

One special embodiment consists in that the fish slaughter device has a stationary housing part, a chassis forming a mounting frame or a base body of the trigger device and a clamping device with which the chassis can be adjustably fixed for presetting an adjusting distance of the fish head abutment element to the receiving space entry on the housing part. This measure improves the ease of handling the fish slaughter device according to the invention with regard to easy and refined adjustment. In particular, the clamping device can be used for manual presetting which adapts operation in a simple manner, for example, to a species of fish. This means that operational control in combination with presetting is kept simple by limiting the automatic operational control to controlling the range for triggering.

Structural and functional units of the trigger device can be combined to form a trigger device which can be handled independently, in particular as an installation device. Such a trigger device, configured for a fish slaughter device having at least one fish slaughter tool for acting on the fish head for slaughtering the fish, in particular for a fish slaughter device according to one of the claims for the fish slaughter device, comprises a chassis forming a base body, a fish head abutment element mounted on said chassis, which abutment element is configured for abutment of the fish head of a fish to be slaughtered, and forming a trigger element which is operable due to abutment of the fish head, said trigger element being connectable to a controller for operating a fish slaughter device, a controllable first control actuator arranged on the chassis with a first actuator element, as well as a coupling mechanism slidingly mounted on the chassis, which slidingly mounts the fish head abutment element on the chassis and connects it to the first actuator element of the first control actuator for adjusting movement of the fish head abutment element which can be controlled depending on the fish size.

The trigger device is configured according to the invention in that the trigger device comprises a controllable second control actuator which is arranged on the chassis, configured for fish-size-dependent adjustment of at least two trigger positions having a second actuator element, wherein the second actuator element can be placed controllably into at least two fixed trigger adjustment positions of the second actuator element, and that the two actuator elements, i.e. the first actuator element and the second actuator element are coupled in such a manner that an adjusting movement of the first actuator element is stopped by a coupling impact against the second actuator element placed in one of its fixed trigger adjustment positions and thereby brings about a said trigger position of the fish head abutment element associated with the set fixed trigger adjustment position of the second actuator element.

With the trigger device configured in particular as an installation or mounting part, a particularly simple construction of the fish slaughter device is achieved, it being particularly easy to assemble, expediently with three main component groups. A first component group then consists of a device lower part which has the fish receiving space together with associated units, such as guides, flaps, drives and advantageously also a bleeding tool. A second component is an upper part with fish slaughter tool arranged thereon, namely the stunning tool. A third component is formed by the trigger device which is arranged on the upper component and in this respect also forms a structural unit with said upper component. This three-part construction and design also has independent inventive significance.

Embodiments of the trigger device, both in a version as an independently manageable installation and mounting device and also as a device whose structural and functional parts form associated components of the fish slaughter device, are emphasised below.

One embodiment of the trigger device consists in that the first actuator element of the first control actuator can be moved with maximum positioning displacement into a fixed trigger setting position of the first actuator element, which is determined by a maximum position displacement of the first actuator element and correspondingly brings about a trigger position of the fish head abutment element, and that further trigger positions of the fish head abutment element are determined by the fixed trigger adjustment positions of the second actuator element. A particularly simple embodiment, which is nevertheless optimal for fish-size-dependent control, consists in that the second control actuator is a bistable actuator whose second actuator element can only be placed in two fixed trigger adjustment positions of the second actuator element which determine two associated trigger positions of the fish head abutment element. Functionally, the bistable control actuator can be in particular simply a controllable, advantageously double-acting pneumatic cylinder. Preferably a bistable actuator, advantageously a controllable, expediently double-acting pneumatic cylinder is also used for the first control actuator.

A preferred embodiment consists in that the chassis has a front side of the chassis and a front chassis section as well as a rear side of the chassis and a rear chassis section, the fish head abutment element being arranged in the front chassis section with a free fish head abutment surface on the front side of the chassis for abutment of the fish head. A construction particularly suitable for the purposes of the invention then consists in that the fish head abutment element, corresponding to the fixed trigger adjustment positions, can be displaced into a rear trigger position most remote from the front side of the chassis, at least one of the trigger positions associated with the second control actuator being distanced from the rear trigger position towards the front side of the chassis. In a simple manner, it is achieved in particular that, corresponding to the fixed trigger adjustment positions, a front trigger position for the abutment of fish heads of small size, at least one middle trigger position between the front and the rear trigger position for the abutment of fish heads of medium size, and the rear trigger position for the abutment of fish heads of large size are adjustable. If necessary, an extension position of the second actuator element out of the second control actuator can also be a fixed trigger adjustment position associated with the rear trigger position.

A preferred embodiment of the coupling mechanism consists in that the coupling mechanism has a coupling rod slidingly mounted on the chassis, a first coupling element connecting the coupling rod to the first actuator element and a second coupling element fixed to the coupling rod which creates the coupling impact to the second actuator element when it is in one of the adjustable fixed trigger adjustment positions. An especially compact design is then achieved in that the two control actuators, namely the first control actuator and the second control actuator are arranged in parallel next to each other on the chassis, the two actuator elements extending on the rear chassis section, and that the coupling mechanism is arranged in parallel next to the two control actuators.

The trigger device according to the invention enables a particularly simple, functionally reliable trigger sensor device in a special manner with a largely reduced, short initiation path and with an optimally reduced mass of a trigger element which works precisely and responds sensitively per se. It reacts as soon as the fish arrives with a low abutment impulse against the fish head abutment element. The advantages are achieved in particular in that arranged on the coupling mechanism of the trigger device is a trigger sensor device displaceable with the fish head abutment element for registering the abutment of a fish head against the fish head abutment element, the fish head abutment element directly forming a component of the sensor device. Expediently, the fish head abutment element for registering the abutment of a fish head against said fish head abutment element, which yields to a limited extent against a restoring force, is mounted, preferably pivotably, on the coupling mechanism. The chassis of the trigger device has connecting elements, for example fastening lugs, fastening holes or pins, preferably clamping pins, by way of which it can be fixed in place on a housing of a fish slaughter device.

Dependent claims are directed at the said embodiments and also other expedient and advantageous embodiments of the invention. Only particularly expedient and advantageous embodiments or embodiment options will be described in greater detail, based on the following description of the embodiments illustrated in the schematic drawing. Each individual or detail design described within an embodiment should be understood as an independent detail example for other embodiments and designs which fall within the invention that are not described or not fully described. In particular, designs or features which have a higher-level independent relevance are highlighted by the term "general".

DETAILED DESCRIPTION OF THE INVENTION

Figure 1:
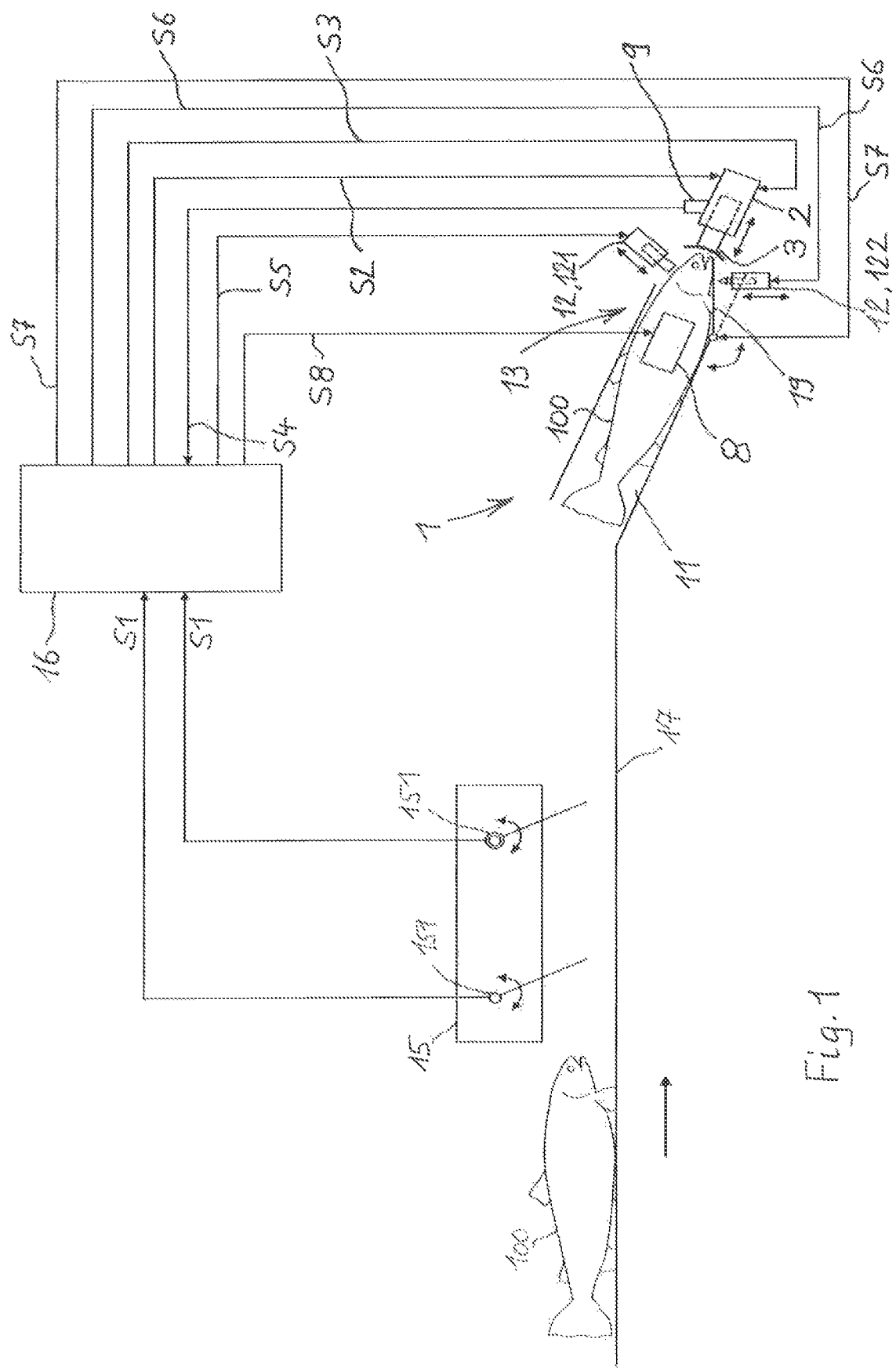
FIG. 1 shows a schematic longitudinal view of a fish slaughter device which is configured with a fish feed-in device, a fish-size determining device and a device controller and has two fish slaughter tools, namely a stunning tool and a bleeding tool.

FIG. 1 shows a schematic representation of a fish slaughter device 1 according to the invention in conjunction with associated operating devices, namely a fish feed-in device 17, a fish-size determining device 15, a device controller 16 and a controllable trigger device 2 according to the invention.

The fish slaughter device 1 comprises a fish receiving space 11, a fish positioning device 13, a trigger sensor device 9, the controllable trigger device 2 and controllable fish slaughter tools 12. A first fish slaughter tool 12 is a stunning tool 121, which acts mechanically on the skull in the head region of the fish 100. A second fish slaughter tool 12 is a bleeding tool 122, which is assigned to the fish underside in the region between head and gills for severing the main artery.

The fish positioning device 13 has a fish head abutment element 3 and a delivery mechanism formed by a pivotable floor flap 19 for releasing and delivering a processed fish 100. The fish positioning device 13 also comprises a flank flap pair 8 for centring the fish 100 in a processing position inside the fish receiving space 11.

The fish feed-in device 17, for example in the form of a basin filled with water or a water-carrying channel, is arranged and configured in such a way that fish 100 to be slaughtered are fed into the fish receiving space 11 in the ventral position and head first. The fish-size determining device 15 is configured and arranged in such a way as to determine the size and if necessary explicitly the thickness of a fish 100 passing through the fish feed-in device 17 for operational control.

The device controller 16 is connected to the trigger device 2, the trigger sensor device 9, the fish slaughter tools 12, the delivery mechanism and the flank flap pair 8 for controlling an automatic slaughtering operation. Signal paths S1 to S8 can be seen from FIG. 1. Such signal paths can be formed by any signal or control route which transmits measurement or control signals, for example wires or even wireless operative connections, if necessary including control circuits or control devices.

In the embodiment according to FIG. 1, the fish-size determining device 15 is equipped with angle encoders 151 which determine the size of the fish, e.g. its length and if necessary explicitly its thickness, and convert it into a suitable control value. The fish-size determining device 15 can be formed by any device suitable for measuring fish. The fish may be weighed for example. The fish-size determining device 15 is arranged upstream of the fish receiving space 11. As is known, the fish-size determining device is connected to a path tracker in order to assign the determined fish size value in each case to the associated fish 100 arriving in the fish receiving space 11. Also, a monitoring device, not shown, is arranged expediently upstream of the determining device 15, with which monitoring device it is ensured that the fish 100 are fed in individually so that they follow each other spaced apart in succession.

The device controller 16 is configured with normal components per se of a computer device and an electronic control system, if necessary in conjunction with control circuits, such as pneumatic control circuits in the signal paths, in such a manner that all devices and mechanisms are activated directly and reset to the starting condition after their activation such that the fish receiving space 11 is ready to receive and process the next fish 100. Advantageously, the device controller 16 is equipped with a programmable logic controller (PLC). In particular, the fish size determination and the control system are programmed for different fish species and/or in adaptation to characteristics of body geometry and/or weight.

Signals obtained with the fish-size determining device 15 and, if necessary, from other devices for steering and tracking the fish are sent to the device controller 16 via the control paths S1. The trigger device 2 is supplied with control signals via the signal paths S2, S3. A control signal obtained from the trigger sensor device 9, which, in the processing position, registers the abutment of the fish head against the fish head abutment element 3, is transmitted via the signal path S4 to the device controller 16. The fish slaughter tools 12 are activated via the signal paths S5 and S6. The delivery mechanism is controlled via the signal path S7 and control of the flank flap pair 8 takes place via the signal path S8.

By way of the fish positioning device 13, the fish 100 arrives in different defined processing positions in the fish receiving space 11 which at the same time are trigger positions and are each determined by a controlled temporary stop position of the fish 100. The fish head abutment element 3 is movable into different trigger positions according to the size of the fish.

According to the invention, the trigger device 2 is designed and controllable in a special manner as is described below. A fish slaughter device 1 according to the invention is described in greater detail, in the embodiment, initially with reference to FIGS. 2 to 4. The fish slaughter device 1 according to FIGS. 2 to 4 has essentially three adjacent component groups I, II and III.

The component group I is a device lower part which forms the fish receiving space 11 with a receiving space entry 111 and a receiving space exit 112. A floor 113 of the fish receiving space 11 is formed by the floor flap 19, which is hinged on the entry side by way of a pivot bearing 191, in such a manner that, forming the delivery mechanism, it holds a fish in a closed, upwardly pivoted position in the fish receiving space 11, while it can be pivoted downwards into an opened position in which a slaughtered fish at the receiving space exit 112 is released out of the fish receiving space 11. Closing and opening position of the floor flap 19 are brought about by way of floor flap actuators 192, 193 which can be activated via the signal path S7. Expediently, pneumatic cylinders which are connected to a controlled compressed air supply in the signal path S7 are used.

The fish receiving space 11 is limited laterally with the flank flap pair 8 in a central region and a rear region in which the fish head comes to rest. The fish is centred for processing between the flank flaps 81. This centring is controlled. Each flank flap 81 is held by way of a hanger assembly 83 which is attached on the entry side of the flank flap pair at the upper end of a vertically oriented shaft 82. The flank flaps 81 can be pivoted towards each other and away from each other by way of the synchronously controlled shafts 82.

Figure 3:
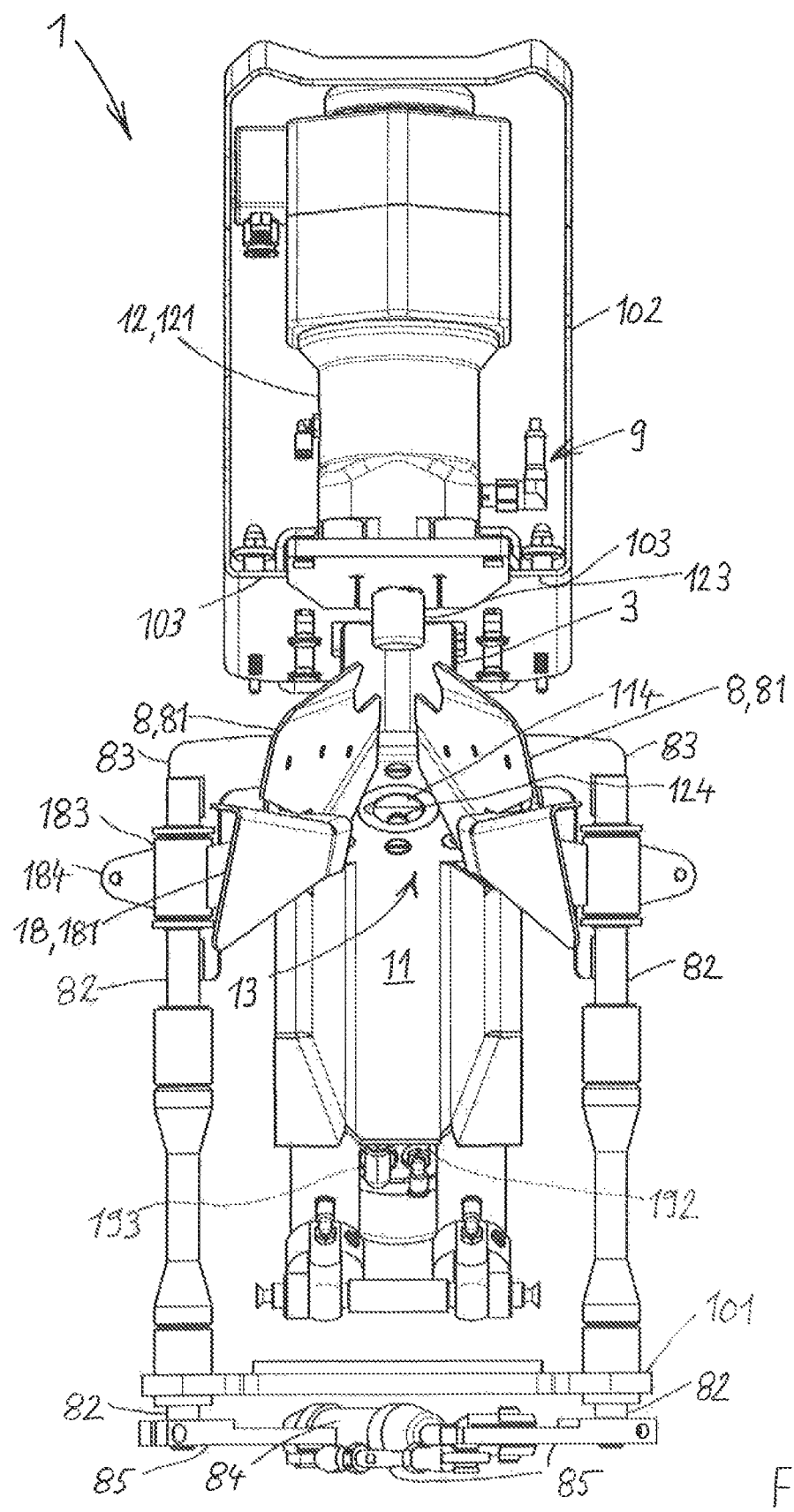
FIG. 3 shows an axonometric representation of a front view of the fish slaughter device according to FIG. 2.
Figure 4:
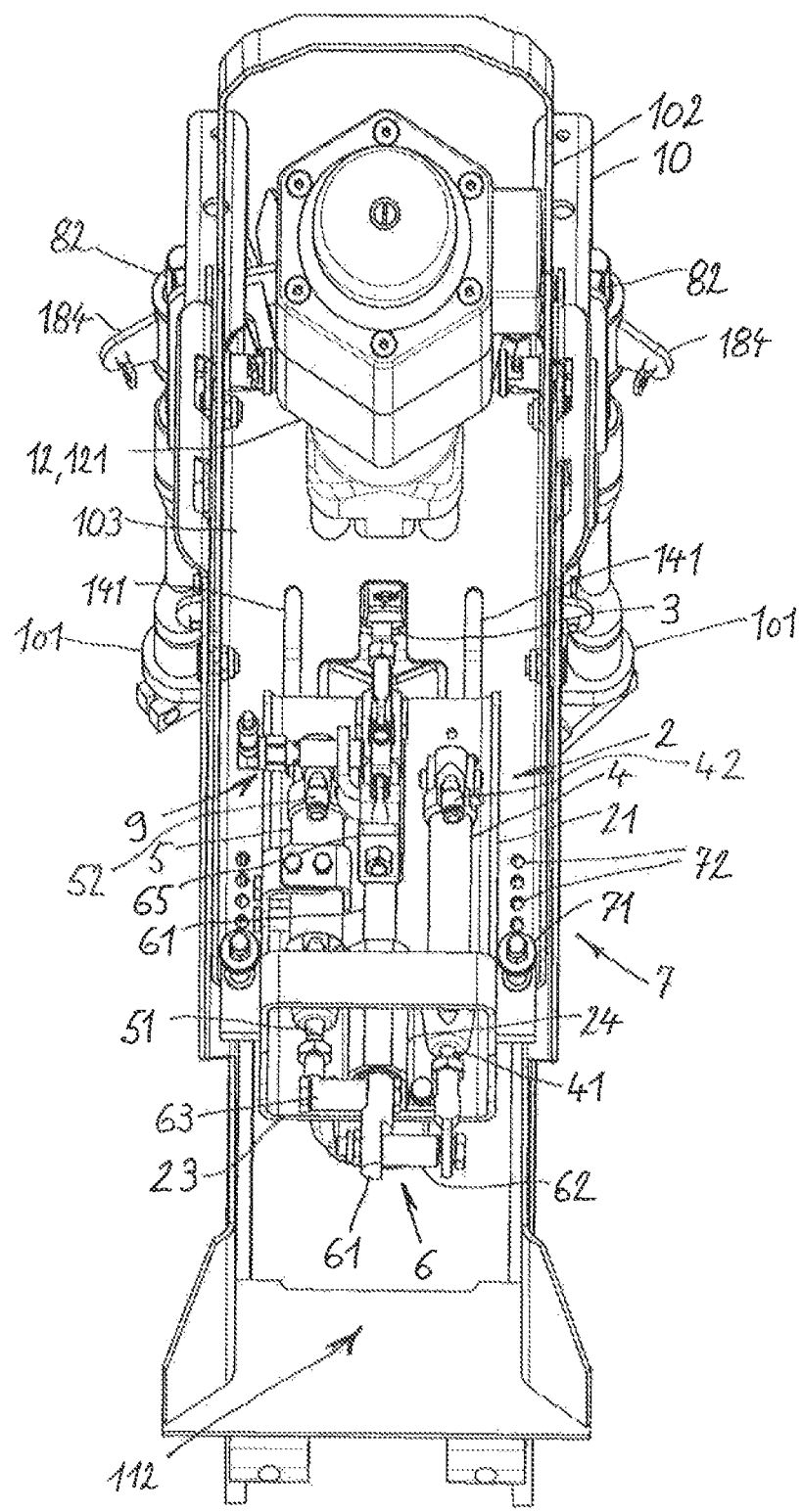
FIG. 4 shows an axonometric representation of a plan view of the fish slaughter device according to FIG. 2 with a plan view of the trigger device.

As can be seen from FIGS. 3 and 4, shaft bearings of the shafts 82 are attached to mounting consoles 101. The synchronous operation of the flank flaps 81 is brought about by way of a synchronization linkage 85 which articulates the shafts 82. The synchronization linkage 85 is connected to a flank flap actuator 84, for example a pneumatic cylinder, which is operated via the signal path S8 in conjunction with a controlled compressed air supply. The flank flap actuator 84 is arranged on the device lower part. In a starting position, the flank flaps 81 are in the narrowest defined V-shaped spacing. In this position, the flank flaps 81 are prestressed with compressive force by way of a controlled lifting force of the flank flap actuator 84, which is controlled for example using proportional valves, and they can be distanced from each other against this compressive force due to displacement by way of a fish arriving between the flank flaps 81 by pivoting open depending on the thickness of the fish. The fish-size-dependently controlled compressive force of the flank flap actuator 84 determines the size of the prestress. Smaller or thinner fish are centred with lower prestress than larger or thicker fish. The compressed air prestress can be controlled continuously as a function of the fish size and/or, depending on fish size ranges, in steps. In particular, the thickness of the fish can generally be measured directly as a fish size value for controlling the flank flaps 81.

In the region of the head position of a fish in the fish receiving space 11, the bleeding tool 122 is arranged on the underside on the receiving space floor 113, said tool having a needle blade 124 which passes through a needle hole 114 in the receiving space floor 113 for acting on a fish to be slaughtered. The bleeding tool 122 is controllable via the signal path S6. It is expediently operated with a pneumatic cylinder via a controlled air supply in the signal path S6.

In the entry-side region of the fish receiving space 11, an entry flap pair 18 is arranged which, partially overlapping, is arranged upstream of the flank flap pair 8. The associated entry flaps 181, which are arranged identically in mirror image on both sides of the fish receiving space 11, are each attached to a hanger assembly 183 and pivotably hinged by way thereof at their entry-side ends about the shafts 82. The entry flaps 181 are unalterably prestressed by way of springs, not shown, which are stretched between tongues 184 and a housing part.

The second component II is formed by a housing upper part 102 with a housing floor 103 and, mounted on the housing floor 103, the stunning tool 121. The stunning tool 121 has a striker 123, under which the fish head comes to rest.

Figure 2:
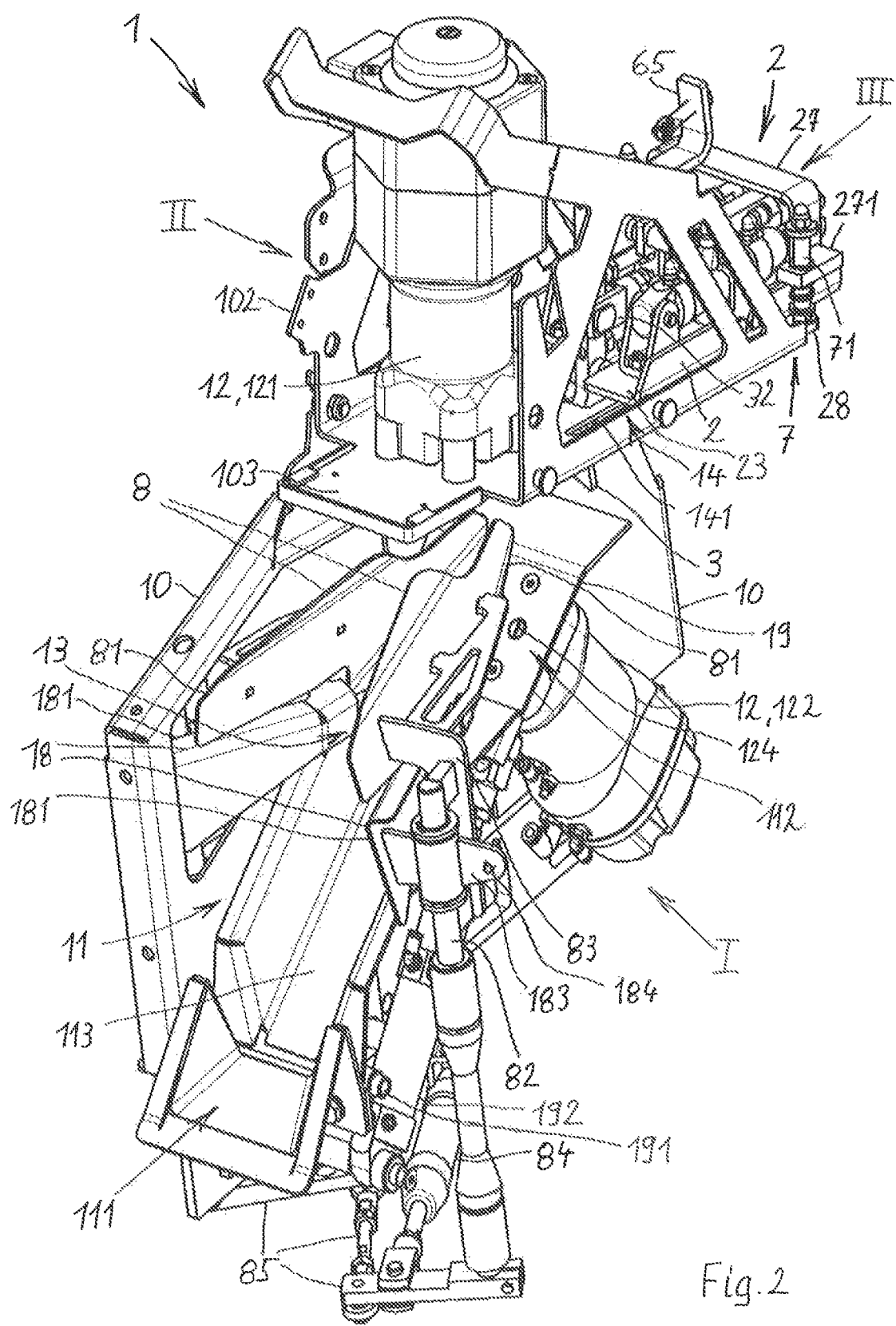
FIG. 2 shows an axonometric representation of a fish slaughter device according to the invention having three component groups with a trigger device according to the invention forming one of the components.

Wall and housing parts 10 of an otherwise not illustrated device housing can only be seen in FIGS. 2 and 4. The housing upper part 102 is attached to the housing part 10 which is only illustrated on one device side in FIG. 2. Generally, organs, units and parts belonging to the fish slaughter device 1 are attached to or mounted on other parts of the device housing, such as frames and walls, which are not shown.

The third component is formed by the trigger device 2 which can generally be fixedly installed on the upper, second component II.

Figure 5:
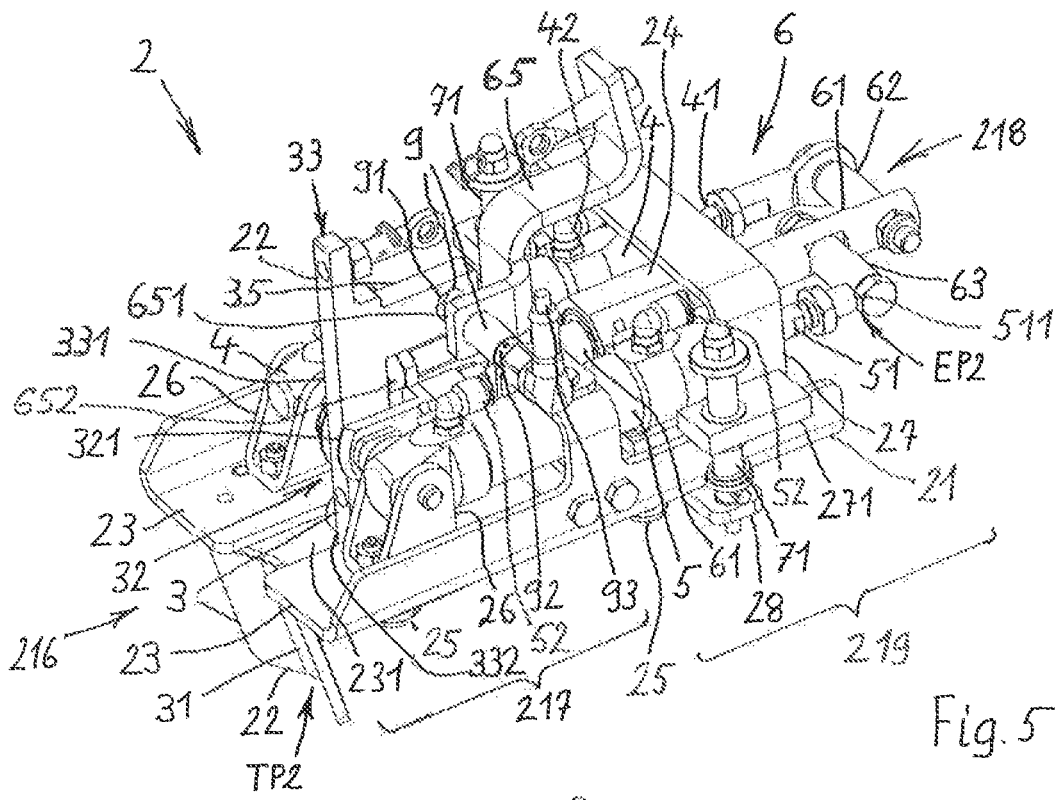
FIG. 5 and FIG. 6 show an axonometric representation of oblique views of a trigger device according to the invention in a first fixed trigger adjustment position and in a second fixed trigger adjustment position of a second actuator element of the trigger device and FIG. 7A to 7C show a plan view of the trigger device according to FIGS. 5 and 6 in three stepped adjustment positions, namely in a maximum, a medium and a minimum adjustment position.

The trigger device 2 has a chassis 21 with a chassis front side 216 and a chassis rear side 218 (see FIG. 5). The chassis floor is formed by a chassis plate 23 which comes to rest on the housing floor 103 and is mounted so as to be slidable and fixable in the longitudinal direction of the chassis 21 for locking adjustment. FIGS. 2 and 4 show a guided sliding support 14 with guiding slots 141 in which pins 25 attached to the underside of the chassis plate 23 are guided. A clamping device 7, by way of which the chassis 21 or the chassis plate 23 can be fixed in different sliding positions on the housing floor 103, also emerges from FIGS. 2 and 4. Spring-loaded pins 71 are arranged laterally in pairs on the chassis 21, said pins each engaging releasably and spring-loaded between bearing consoles 271, 28 into a row of associated clamping holes 72 in the housing floor 103. The bearing consoles 271 sit on a chassis portal support 27.

Particular details of the trigger device 2 according to the invention, which are generally essential and are shown only by way of example in the embodiment, emerge from FIGS. 5 to 7C.

The chassis 21 supports two control actuators 4, 5 arranged in parallel next to each other, extending in the longitudinal direction of the chassis 21. Front ends of the control actuators 4, 5 are fixed to bearing brackets 26. In a rear chassis section 219, piston rods, which form the actuator elements 41 and 51, protrude at the other, rear ends of the control actuators 4, 5. In the region between the control actuators 4, 5 and parallel thereto, a coupling rod 61 of a coupling mechanism 6 is slidingly mounted in the longitudinal direction by way of a guiding sleeve 24 fixed to the chassis plate 23. On the rear side of chassis 218, the coupling rod 61 is connected via a first coupling element 62 of the coupling mechanism 6 to the one first controlling element 41 for synchronisation therewith. In addition, attached to the rear end of the coupling rod 61 is a second coupling element 63 of the coupling mechanism 6, which protrudes upstream of an abutment head 511 of the other second actuator element 51 into its travel. The two coupling elements 62, 63 are transverse elements, for example in the form of bolts or sleeves which are transverse to the coupling rod 62 and attached thereto.

A vertical support 65 and a bearing bracket 321 protruding into a front chassis section 217 is mounted on the front end of the slidable coupling rod 61. The bearing bracket 321 forms a pivot mounting 32 of a pivotably hinged, two-armed pivot arm 33, which forms the fish head abutment element 3. A lower arm 332 extending through the chassis plate 23 through a recess 231 ends with a fish head abutment surface 31 underneath the chassis plate 23. The fish head abutment surface 31 is concave in shape for abutment of the fish head. An upper pivot arm 331 of the pivot arm 33 is prestressed by a tension spring 34, which tensions the upper pivot arm 331 against an abutment bolt 652 projecting forwards on the vertical support 65, and is stretched between the free end of the upper arm 331 and an upper part of the vertical support 65. Against the prestress force of the tension spring 34, therefore under restoring force, the pivot arm 33 is deflectable by pivoting slightly, namely until it stops against a fixed abutment element on the vertical support, for example an abutment bolt 653.

The upper pivot arm 331 also has a rear protrusion 35 in which a sensor hole 91 is incorporated, said hole opposing a lug 651 which is attached to the vertical support 65. A sensor 92 with a sensor head opposing the sensor hole 91 is attached to this lug 651. The sensor hole 91 and the sensor 92 form, in the manner or a proximity switch, a trigger sensor device 9 displaceable with the coupling mechanism 6, which has a sensor connection 93 for connection to the device controller 16 via the signal path S6. Any other trigger sensor device, which is mountable with its parts on the slidable coupling mechanism 6 or the vertical support 65 and registers an abutment of the fish head against the fish head abutment surface 31, can be used.

The two control actuators 4, 5, namely the one first control actuator 4 and the other second control actuator 5, are configured according to the invention such that they cooperate particularly in order to bring the coupling rod 61 and thus the parts attached thereto in the front chassis section 217 into different sliding positions together. The fish head abutment element 3 is placed with the fish head abutment surface 31 in different trigger positions TP1, TP2 and TP3 by control mechanism of the device controller.

Figure 7A:
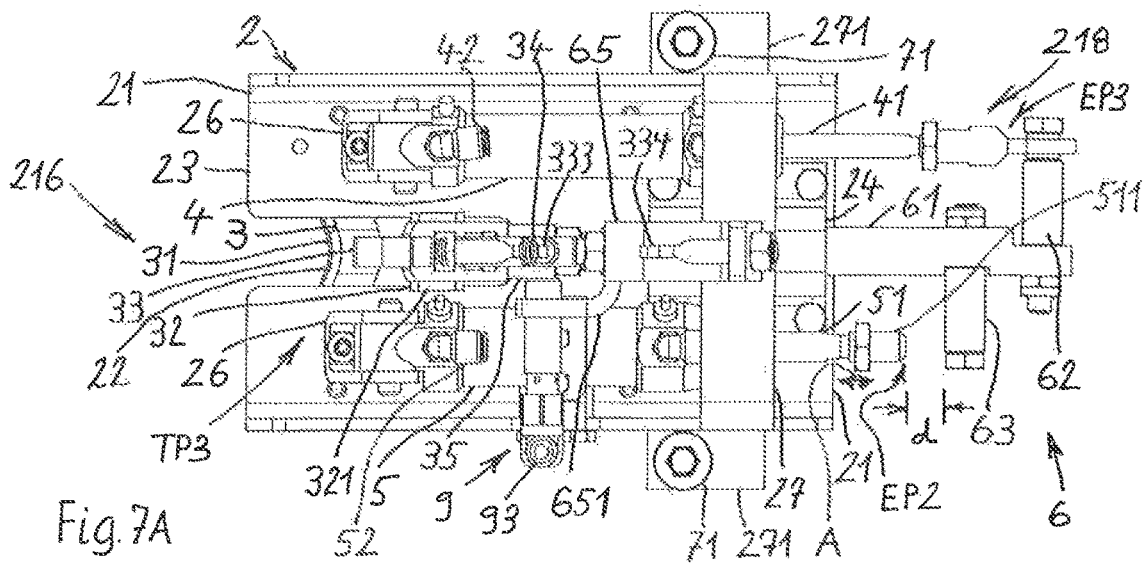

The trigger position TP3, in which the fish head abutment element 3 is maximally offset towards the rear side of chassis 218, is brought about by extending the first actuator element 41 with maximum length of stroke. For this purpose, the first control actuator 4 is operated in a controlled manner with extension force. The first control element 41 is then in a stable and exact position which defines the fixed trigger adjustment position EP3. This situation is illustrated in FIG. 7A. Advantageously, the first control actuator 4 is a bistable actuator, expediently a pneumatic cylinder which can be controlled by way of a compressed air supply controlled in the signal path S2. In the example, the first control actuator 4 is a double-acting pneumatic cylinder with control air junctions 42.

In general, the device is such that the fixed trigger adjustment position EP3 with associated trigger position TP3 is adjusted simply by way of the fully extended first actuator element 41 of the first control actuator 4. In contrast, further trigger positions, offset towards the front side of chassis 216, in the embodiment the trigger positions TP1 and TP2, are adjusted by the second control actuator 5. In these adjustments, the second control actuator 5 works as the "master" and the first control actuator 4 is operated as the "slave" with a return force that is kept smaller than an extension force of the second control actuator 5.

Figure 7B:
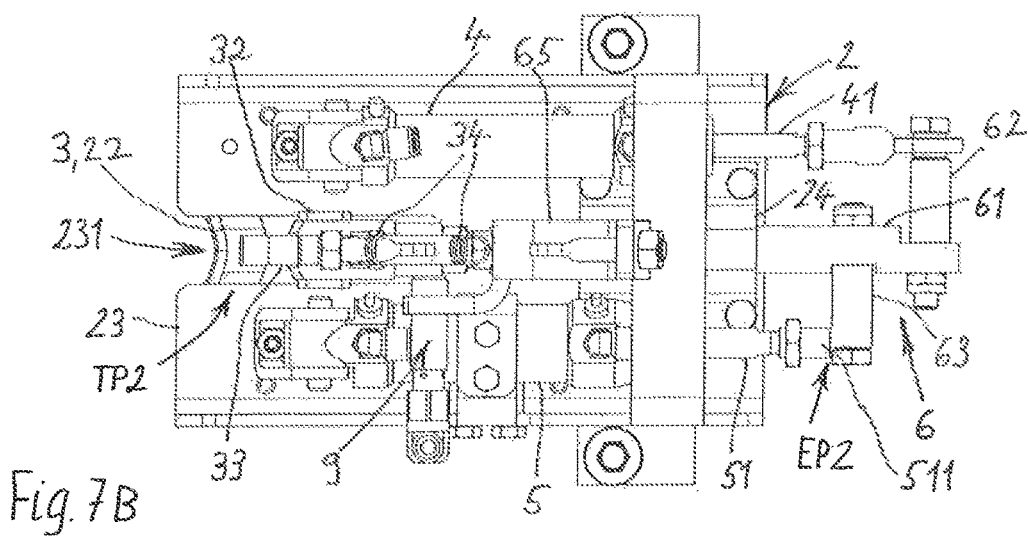

In FIGS. 7A and 7B, the second actuator element 51 of the second control actuator 5 is in the fully extended stable position that is under pressure or extension force. Preferably, the second control actuator 5 is also formed by a bistable actuator, expediently a double-acting pneumatic cylinder with control air junctions 52 and operated by way of a controlled air supply via the signal path S3. The second actuator element 51 can then, like the first actuator element 41, only be moved bistably into two end positions.

As illustrated for example in FIG. 7A, it is generally possible to adjust a step distance d between an abutment head 511, expediently on the free end of the second actuator element 51, and a coupling element protruding in front of it such as the second coupling element 63. In the simplest case, this can be determined by a fixed distance of the free ends of the actuator elements 41, 51 which are fully extended in the stable states. The step distance d can be configured to be modifiable. For example, the abutment head 511 can be designed as an adjusting head, e.g. as a screw head, which is axially adjustable in an adjusting area A. Correspondingly different distances d can then be adjusted, in particular manually. Other adjusting devices for changing the fixed distance d can be provided. For example, the second coupling element 63 can be arranged on the coupling rod 61 so as to be axially displaceable. The distance d determines an adjustment stage, namely the extent of the displacement of the fish head abutment element 3 out of the trigger position TP3 into the trigger position TP2 or vice versa.

In FIG. 7B, the trigger device 2 is in the state of an adjustment with fixed trigger adjustment position EP2 and associated trigger position TP2. Starting from the position EP3 of the fully extended first actuator element 41, the adjustment can be effected in that the first control actuator 4 is operated in a controlled manner such that the first actuator element 41 is retracted with return force. As a result of this, the second coupling element 63, which is picked up via the first coupling element 62, which is generally connected tension-resistantly to the first actuator element 41, and via the coupling rod 61, abuts against the abutment head 511. The second coupling element 63 is held in this position, that is by the controlled return of the first actuator element 41, in particular with maintained return force. This return force is kept smaller than the extension force of the second control actuator 5. In the fully extended position, the second control actuator element 51 is also under load in stable and accurate trigger adjustment position EP2. The trigger position TP2, in which the fish head abutment element 3 with the fish head abutment surface 31 is located, lies approximately in the middle of the front chassis section 217 as can be seen in FIG. 5.

Figure 6:
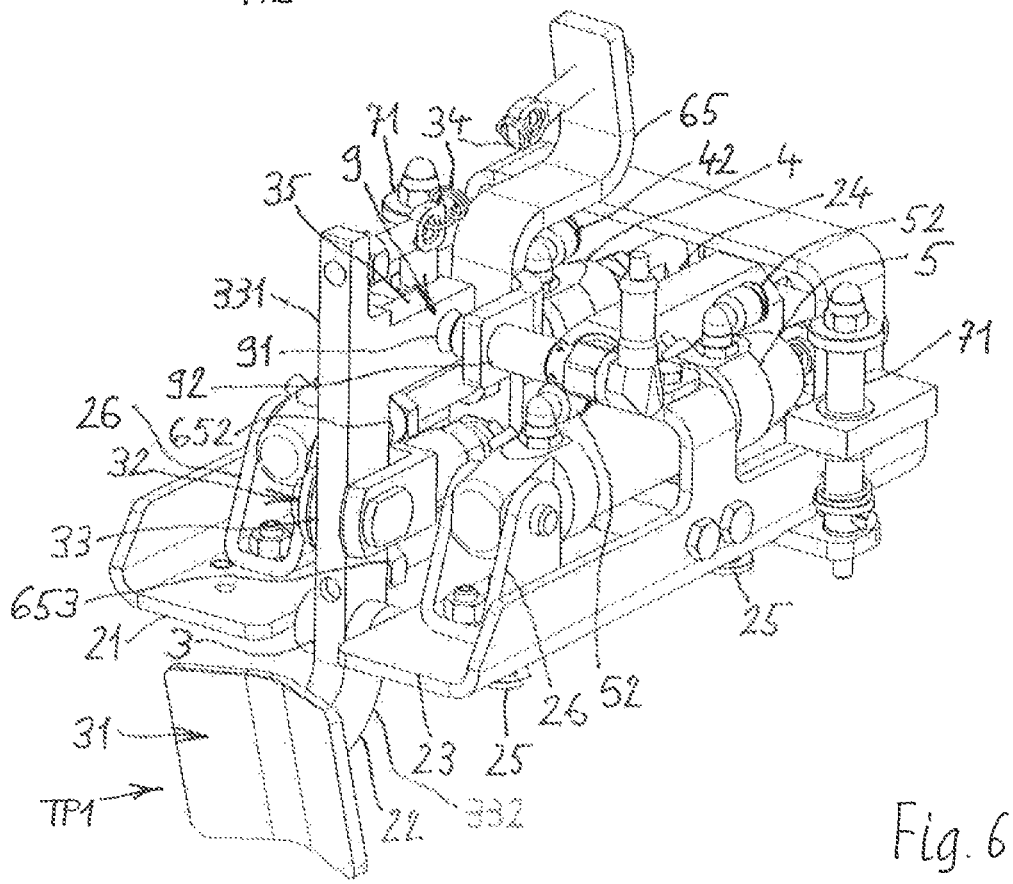
Figure 7C:
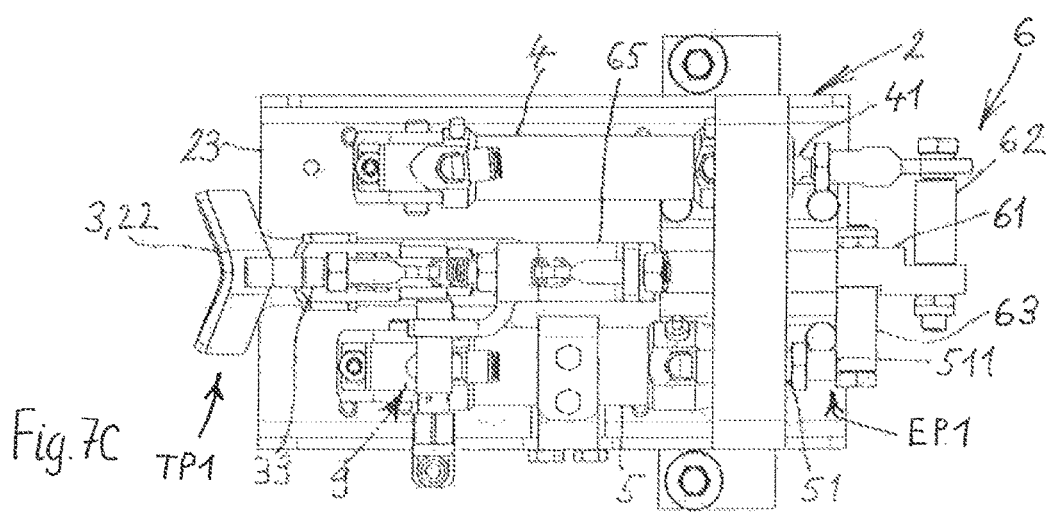

In FIGS. 6 and 7C, the second actuator element 51 of the second control actuator 5 is in the fully retracted or withdrawn state such that the abutment head 511, also under high abutment force, assumes a stable and accurate position, namely a fixed trigger adjustment position EP1. The second actuator element 51, controlled according to the fish size, may already be in this state or the state may be achieved in that the second control actuator 5 is put under return force, it being controlled from the EP2 state with fully extended second actuator element 51 into the state with fully retracted second actuator element 51 by way of the device controller 16. The first control actuator 4 is then controlled such that the first actuator element 41 is placed under return force or remains placed under return force in order to bring about the abutment of the second coupling element 63 against the abutment head 511. The return force of the first control actuator 4 is preferably kept greater than the return force of the second control actuator 5. The distance between the fixed trigger adjustment positions EP1 and EP2 determines a further or second adjustment stage. The trigger position TP1 of the fish head abutment element 3, which is part of the fixed trigger adjustment position EP1, is in a front area of the front chassis section 217 with fish head abutment surface 31 protruding on the front side of chassis 216.

The second actuator element 51 is extended completely in order to bring the second actuator element 51, starting from the trigger adjustment position EP1, into the trigger adjustment position EP2. At the same time, the first control actuator 4 is switched such that the second coupling element 63 and thus the coupling mechanism 6 are sufficiently freely movable into the second trigger adjustment position EP2. One control mode exists in that the first actuator element 41, which is already under or is placed under return force, is pulled out of the first control actuator 4. For this purpose, the second actuator element 51 is operated by way of the controller of the second control actuator 5 with an extension force that is greater than the return force of the first control actuator 4 and engages on the first actuator element 41 under abutment of the second actuator element 51 at the second coupling element 63 via this and the first coupling element 62 which is connected tension-resistantly to the first actuator element 41. In the trigger adjustment position EP2, the greater extension force of the second control actuator 5 compared to the return force of the first control actuator 4 is retained. Another control mode consists in that the first control actuator 4 is depressurised during the extension of the second actuator element 51 or is placed into its extended state and then, for stable abutment of the second coupling element 63 against the second actuator element 51 extended into its end position, is acted upon with a return force which is smaller than the holding or extension force of the second control actuator 5.

In the embodiment, three trigger positions TP1, TP2 and TP3 have been configured for the fish head abutment element 3 which, as described, are adjusted by the interplay of the two control actuators 4, 5 controlled according to the fish size. As can be seen from FIGS. 2 to 4, the trigger position TP1 is assigned in steps to small fish sizes, the trigger position TP2 to medium fish sizes and the trigger position TP3 to large fish sizes. It has been found that with the in particular three settings, which are automatically controlled as a function of the fish size classes, the fish are sufficiently positioned in certain areas to be stunned and bled reliably and in compliance with animal welfare by way of the fish slaughter tools 12. To adapt the three trigger positions TP1, TP2 and TP3 in particular to one fish species before automatic operation is started, the trigger device 2 is manually positioned to the extent adjusted by way of the optional clamping device 7 in the direction of the receiving space entry 111 or contrarily in the direction of the receiving space exit 112. A further manual preadjustment may consist in that the abutment head 511 of the second actuator element 51 is adjusted, as described, in the adjusting area A.

The controlled flank flap pair 8 described optimises the use of the in particular only three automatically set trigger positions TP1, TP2 and TP3. The centring configured with the flank flap pair 8, which is carried out size-dependently, preferably directly thickness-dependently, and thus uniformly accurately for every fish size or fish size ranges or thickness dimensions, counteracts lateral variance of the fish head positions or a deviation from a uniform central position under the fish slaughter tools 12 such that the size ranges of the (three) fish groups can be optimally selected without impairing slaughter success that is compliant with animal welfare.

The mode of operation of the trigger device 2 and the fish slaughter device 1 already emerges from the existing description. It is generally particularly noteworthy that the fish head abutment element 3 and the trigger sensor device 9 are both mounted on the coupling mechanism 6 and can thus be moved together and uniformly during adjustment into the trigger positions. It is thus achieved that the fish head abutment element 3 is directly the trigger element for initiating/bringing about the operation of the fish slaughter tools 12. In the embodiment, the trigger sensor device 9 picked up by the coupling mechanism 6 operates in such a manner that the abutment of a fish head against the fish head abutment surface 31 causes the slight, specifically limited pivoting deflection of the pivot arm 33, wherein a resulting position change of the sensor hole 91 or of an equivalent significant reference element in respect of the sensor 92 is recorded by the sensor and transmitted as a trigger control signal via the signal path S4 in order to start up the fish slaughter tools 12. Otherwise, the processing operation in the fish slaughter device 1 proceeds in a manner known per se. Downstream of the slaughtering operation of the fish slaughter tools 12 for slaughtering the fish stopped at the trigger positions TP1, TP2 and TP3 or further trigger positions, that is in the associated temporary stop positions, the fish slaughter tools 12 are spontaneously retracted and the floor flap 19 is opened briefly for delivery of the slaughtered fish. The flank flaps 81 additionally provided according to the invention in the embodiment, which automatically centre the fish to be slaughtered, can be temporarily depressurised to release the slaughtered fish.

The invention claimed is:

1. A fish slaughter device comprising:
    a fish receiving space, which can be charged with fish to be slaughtered in the head-first position through a receiving space entry;
    a fish positioning device configured for controllably holding and positioning a fish in the fish receiving space in a temporary stop position of said fish, which is associated with at least one controllable fish slaughter tool for slaughtering the fish, and also configured for controllably releasing the slaughtered fish, comprising a fish head abutment element, against which the fish head of the fish abuts in the temporary stop position, which in addition forms a trigger element for controlling the at least one controllable fish slaughter tool and can be moved by way of a trigger device, which is controllable as a function of the fish size, into different trigger positions each determining the temporary stop position of the fish, and comprising a delivery device for releasing and delivering the processed fish;
    the at least one controllable fish slaughter tool for acting on the fish in its temporary stop position;
    a trigger sensor device for detecting the abutment of a fish head against the fish head abutment element; and
    the controllable trigger device, comprising the fish head abutment element, a stationary, controllable first control actuator with a first actuator element and a coupling device which connects the fish head abutment element to the first actuator element of the first control actuator for fish-size-dependent controllable adjusting movement of the fish head abutment element into the trigger positions,
    wherein the trigger device comprises a stationary, controllable second control actuator configured for fishsize-dependent adjustment of at least two trigger positions (TP1, TP2) having a second actuator element, wherein the second actuator element can be placed controllably into at least two fixed trigger adjustment positions (EP1, EP2), and that the two actuator elements, which comprise the first actuator element and the second actuator element are coupled in such a manner that an adjusting movement of the first actuator element is stopped by a coupling impact against the second actuator element placed in one of its fixed trigger adjustment positions (EP1, EP2) and thereby brings about an associated said trigger position (TP1, TP2) of the fish head abutment element associated with the set fixed trigger adjustment position (EP1, EP2) of the second actuator element.

2. The fish slaughter device according to claim 1, wherein the fish positioning device for centring the fish in the temporary stop position comprises at least two flank flaps which limit the fish receiving space laterally, and that said flank flaps can be acted upon by a compressive force, which is dependent upon the fish size of the fish, in a defined home position in which each fish arrives between the flank flaps, such that the fish can displace the flank flaps against the compressive force depending on the fish size.

3. The fish slaughter device according to claim 1, further comprising a fish-size determining device determining the fish size for generating fish-size-dependent control signals.

4. The fish slaughter device according to claim 3, further comprising a device controller which, for fish-size-dependent operational control, is connected to at least the fish-size determining device, the controllable control actuators of the trigger device, the trigger sensor device, the at least one controllable fish slaughter tool and the controllable delivery device.

5. The fish slaughter device according to claim 1, wherein the fish slaughter device has a stationary housing, a chassis forming a mounting frame of the trigger device and a clamping device with which the chassis can be fixedly and adjustably clamped for presetting an adjusting distance of the fish head abutment element to the receiving space entry on the housing.

6. The fish slaughter device according to claim 1, wherein a sliding seat with a clamping device is designed between a housing part of the fish slaughter device and a chassis of the trigger device, wherein the chassis of the trigger device can be adjustably fixed for presetting an adjusting distance of the fish head abutment element to the receiving space entry of the fish receiving space on the housing part of the fish slaughter device.

7. A trigger device configured for the fish slaughter device according to claim 1, comprising a chassis, the fish head abutment element mounted on said chassis, which abutment element is configured for abutment of the fish head of a fish to be slaughtered, and forming the trigger element which is operable due to abutment of the fish head, said trigger element being connectable to a controller for operating the fish slaughter device, the controllable first control actuator arranged on the chassis with the first actuator element, as well as the coupling device slidingly mounted on the chassis, which slidingly mounts the fish head abutment element on the chassis and connects it to the first actuator element of the first control actuator for adjusting movement of the fish head abutment element which can be controlled depending on the fish size, wherein the trigger device comprises the controllable second control actuator, which is arranged on the chassis, configured for fish-size-dependent adjustment of the at least two trigger positions (TP1, TP2) having the second actuator element, wherein the second actuator element can be placed controllably into the at least two fixed trigger adjustment positions (EP1, EP2) of the second actuator element, and that the two actuator elements, which comprise the first actuator element and the second actuator element are coupled in such a manner that an adjusting movement of the first actuator element is stopped by a coupling impact against the second actuator element placed in one of its fixed trigger adjustment positions (EP1, EP2) and thereby brings about said trigger position (TP1, TP2) of the fish head abutment element associated with the set fixed trigger adjustment position (EP1, EP2) of the second actuator element.

8. The trigger device according to claim 7, wherein the first actuator element of the first control actuator can be moved with maximum positioning displacement into a fixed trigger setting position (EP3) of the first actuator element, which is determined by a maximum position displacement of the first actuator element and correspondingly brings about a trigger position (TP3) of the fish head abutment element, and that said trigger positions (TP1, TP2) of the fish head abutment element are determined by the fixed trigger adjustment positions (EP1, EP2) of the second actuator element.

9. The trigger device according to claim 7, wherein the second actuator element can be placed bistably into only two fixed trigger adjustment positions (EP1, EP2) of the second control actuator, said positions (EP1, EP2) determining two corresponding trigger positions (TP1, TP2) of the fish head abutment element.

10. The trigger device according to claim 7, wherein the chassis has a front side of the chassis and a front chassis section as well as a rear side of the chassis and a rear chassis section, wherein the fish head abutment element is arranged in the front chassis section with a free fish head abutment surface on the front side of the chassis for abutment of the fish head.

11. The trigger device according to claim 10, wherein the fish head abutment element can be displaced into a rear trigger position (TP3) remote from the front side of the chassis, wherein at least one of the trigger positions (TP1, TP2) associated with the second control actuator is distanced from the rear trigger position (TP3) towards the front side of the chassis.

12. The trigger device according to claim 11, wherein, corresponding to the fixed trigger adjustment positions (EP1, EP2, EP3), said trigger position (TP1) is utilized for the abutment of fish heads of small size, said trigger position (TP2) is arranged between the trigger position (TP2) and the trigger position (TP3) and is utilized for the abutment of fish heads of medium size, and said trigger position (TP3) is utilized for the abutment of fish heads of large size and can be adjusted.

13. The trigger device according to claim 7, wherein the coupling device has a coupling rod slidingly mounted on the chassis, a first coupling element connecting the coupling rod to the first actuator element and a second coupling element is fixed to the coupling rod which creates the coupling abutment to the second actuator element when it is in one of the adjustable fixed trigger adjustment positions (EP1, EP2).

14. The trigger device according to claim 7, wherein the two control actuators, comprise the first control actuator and the second control actuator, are arranged in parallel next to each other on the chassis, wherein the two actuator elements extend on a rear chassis section, and that at least part of the coupling device is arranged in parallel to the two control actuators.

15. The trigger device according to claim 7, the trigger sensor device, which can be displaced with the fish head abutment element for detecting the abutment of a fish head against the fish head abutment element, is arranged on the coupling device of the trigger device, wherein the fish head abutment element forms part of the sensor device.

16. The trigger device according to claim 7, wherein the fish head abutment element for detecting the abutment of a fish head against the fish head abutment element, which yields to a limited extent against a restoring force, is mounted on the coupling device.

17. The trigger device according to claim 7, wherein a distance can be adjusted between the second actuator element and a coupling element of the coupling device, with which the two actuator elements can be coupled.

18. A fish slaughter device comprising
a fish receiving space having a receiving space entrance and being configured to receive a fish to be slaughtered in a head-first position;
a fish positioning device configured to:
controllably hold and position the fish in the fish receiving space in a temporary stop position of the fish; and
controllably release the fish when slaughtered;
at least one controllable fish slaughter tool associated with the fish positioning device and being configured to carry out slaughtering of the fish;
a fish head abutment element positioned so as to allow a head of the fish to abut the fish head abutment element when the first is in the temporary stop position;
a trigger device associated with said fish head abutment element and being configured to control the at least one controllable fish slaughter tool;
said at least one controllable fish slaughter tool being controllable as a function of fish size and being caused to perform slaughtering in different trigger positions of the fish head abutment element;
a delivery mechanism configured to release and deliver a processed fish;
a trigger sensor configured to detect the abutment of the fish head against the fish head abutment element;
a controllable first control actuator associated with the trigger device and comprising a first actuator element and a coupling mechanism that connects the fish head abutment element to the first actuator element;
a controllable second control actuator associated with the trigger device and comprising a second actuator element configured to be controllably positioned into fixed trigger adjustment positions;
the first actuator element being coupled to the second actuator element in such a manner that an adjusting movement of the first actuator element is stopped by a coupling impact against the second actuator element when positioned in one of the fixed trigger adjustment positions associated with one of the different trigger positions of the fish head abutment element.

19. A fish slaughter device comprising
a fish receiving space having a receiving space entrance and being configured to receive a fish to be slaughtered in a head-first position;
a fish positioning device configured to:
hold and position the fish in the fish receiving space in a temporary stop position of the fish; and
release the fish when slaughtered;
at least one fish slaughter tool associated with the fish positioning device and being configured to carry out slaughtering of the fish;
a fish head abutment element positioned so as to allow a head of the fish to abut the fish head abutment element when the first is in the temporary stop position;
a trigger device associated with said fish head abutment element and being configured to control the at least one fish slaughter tool;
said at least one fish slaughter tool being controllable as a function of fish size and being caused to perform slaughtering in different trigger positions of the fish head abutment element;
a delivery mechanism configured to release and deliver a processed fish;
a trigger sensor configured to detect the abutment of the fish head against the fish head abutment element;
a first control actuator associated with the trigger device and comprising a first actuator element and a coupling mechanism that connects the fish head abutment element to the first actuator element;
a second control actuator associated with the trigger device and comprising a second actuator element configured to be controllably positioned into fixed trigger adjustment positions; and
a control communicating with at least the fish positing device, the at least one fish slaughter tool, the trigger device and the trigger sensor.

20. The fish slaughter device of claim 19, wherein the first actuator element is coupled to the second actuator element in such a manner that an adjusting movement of the first actuator element is stopped by a coupling impact against the second actuator element when positioned in one of the fixed trigger adjustment positions associated with one of the different trigger positions of the fish head abutment element.

* * * * *

UNITED STATES PATENT AND TRADEMARK OFFICE
CERTIFICATE OF CORRECTION

PATENT NO. : 10,681,917 B2  
APPLICATION NO. : 16/315915  
DATED : June 16, 2020  
INVENTOR(S) : Torsten Rusko et al.

Page 1 of 1

It is certified that error appears in the above-identified patent and that said Letters Patent is hereby corrected as shown below:

On the Title Page

Column 1, item (71) Applicant, which reads:  
"(71) Applicant:   NORDISCHER MASCHINENBAU RUD. BAADER GMBH + CO. KG, Luebeck (DE)"

Should read:  
-- "(71) Applicant:   NORDISCHER MASCHINENBAU RUD. BAADER GMBH + CO. KG, Lübeck (DE)" --

Column 1, at item (72) Inventors, which reads:  
"(72) Inventors:   Torsten RUSKO, Herrnburg (DE);  
Dirk RUNGE, Luebeck (DE);  
Mirko PAGELS, Luebeck (DE)"

Should read:  
-- "(72) Inventors:   Torsten RUSKO, Herrnburg (DE);  
Dirk RUNGE, Lübeck (DE);  
Mirko PAGELS, Lübeck (DE)" --

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*